United States Patent
Lu et al.

(10) Patent No.: US 6,725,140 B2
(45) Date of Patent: Apr. 20, 2004

(54) METHOD AND APPARATUS FOR DETERMINING LATERAL VELOCITY OF A MOTOR VEHICLE IN CLOSED FORM FOR ALL ROAD AND DRIVING CONDITIONS

(75) Inventors: Jianbo Lu, Livonia, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 10/140,240

(22) Filed: May 7, 2002

(65) Prior Publication Data

US 2003/0212482 A1 Nov. 13, 2003

(51) Int. Cl.[7] .......................... G06F 17/10; G06F 19/00
(52) U.S. Cl. .......................... 701/45; 701/70
(58) Field of Search .............. 701/45, 72, 37, 701/38, 70; 280/5.507, 5.508

(56) References Cited

U.S. PATENT DOCUMENTS

| | | | |
|---|---|---|---|
| 5,311,431 A | * | 5/1994 | Cao et al. ..................... 701/72 |
| 5,742,919 A | | 4/1998 | Ashrafi et al. |
| 6,195,606 B1 | * | 2/2001 | Barta et al. ..................... 701/70 |
| 6,477,480 B1 | * | 11/2002 | Tseng et al. ................. 702/142 |

* cited by examiner

Primary Examiner—Michael J. Zanelli
(74) Attorney, Agent, or Firm—Artz & Artz; Gary A. Smith

(57) ABSTRACT

An apparatus for determining lateral velocity of an automotive vehicle (10) includes a vehicle speed sensor (20), a roll rate sensor (34), a yaw rate sensor (28), a lateral acceleration sensor (32), and a longitudinal acceleration sensor (36). A controller (26) is coupled to the sensors and determines a steady state pitch angle and a steady state roll angle as a function of the lateral acceleration signal, the longitudinal acceleration signal, the yaw rate signal, and the vehicle speed signal. The controller determines a sliding index as a function of the steady state pitch signal, the steady state roll angle, and the roll rate signal. The controller (26) determines lateral velocity as a function of the sliding index and controls the vehicle lateral motion based on the estimated lateral velocity.

17 Claims, 3 Drawing Sheets

METHOD AND APPARATUS FOR DETERMINING LATERAL VELOCITY OF A MOTOR VEHICLE IN CLOSED FORM FOR ALL ROAD AND DRIVING CONDITIONS

TECHNICAL FIELD

The present invention relates generally to determining the dynamic state of an automotive vehicle, and more particularly, to a method and apparatus for determining lateral velocity of an automotive vehicle.

BACKGROUND

It is a well-known practice to control various operating dynamics of a motor vehicle to achieve active safety, using yaw and roll stability control systems. The effective operation of the various safety control devices requires high-accuracy and fast-response-time of the operating state of the motor vehicle, regarding the various road conditions and driving conditions. One important operating state used in such systems is the vehicle lateral velocity.

As a vehicle is driven, it may slide with respect to the road surface along the vehicle lateral axis, especially when it is driven on a low friction (low mu) road surface. This sliding can be quantitatively estimated using the lateral velocity of the center of gravity of the vehicle, projected on the lateral direction of the vehicle. The lateral velocity combined with other vehicle dynamic variables, such as longitudinal velocity and yaw rate, may be used for vehicle attitude sensing. The vehicle attitude may be used to generate control commands for vehicle yaw and roll stability control systems. Lateral velocity may be directly measured by sensors such as optical sensors or global positioning system (GPS) sensors. However, those sensors are very costly for the current vehicle dynamics controls. Hence it is desirable to use other available sensor signals to estimate the vehicle lateral velocity.

Many known systems rely upon basic assumptions regarding conditions such as driving on a flat surface (no pitch or bank angle), or on a high mu surface, or with a small vehicle attitude change. One example of such a system is found in U.S. Pat. No. 5,742,919, which provides a method to estimate the lateral velocity. The disclosed method is accurate only when the road is flat, the road surface has high mu, and vehicle has very small roll motion.

Another known method uses a lateral acceleration sensor signal to construct the time derivative of the vehicle lateral velocity by taking away the product of the yaw rate and the vehicle longitudinal velocity. Since the road condition (for example, the road bank and slope), the dynamic roll, and the dynamic pitch attitude of the vehicle will generate an extra component in the lateral acceleration, this method fails to detect accurate lateral velocity on banked/slope road or when the vehicle body has significant attitude changes. For example, an aggressive driver steering input may cause large roll attitude variation of the vehicle; during off-road driving, the large road bank and slope will be experienced through vehicle attitude changes. A vehicle with large lateral acceleration maneuvers could achieve 6 degrees of relative roll angle between the vehicle body and a level road surface. If such a vehicle is driven at 45 mph off camber on a 10 degree banked road, the lateral acceleration sensor reading will be increased by 2.7 m/s² solely due to gravity. Hence, neglecting the road bank and the vehicle roll information could introduce an error of 2.7 m/s per second. That is, a 2 second maneuver in this case will end up with around 5.4 m/s lateral velocity error which is more than 27% of the vehicle speed of 45 mph.

It would therefore be desirable to provide a robust determination of lateral velocity that is reliable on roads having banks, slopes, various surface mu's and when the vehicle is operating under changing dynamic conditions.

SUMMARY OF THE INVENTION

The present invention provides a robust determination of lateral velocity of the vehicle that maintains high accuracy by incorporating or compensating for various dynamic conditions of the vehicle and for various road conditions.

In one aspect of the invention, an apparatus for determining lateral velocity of an automotive vehicle includes a vehicle speed sensor that generates a vehicle speed signal, a roll rate sensor for generating a roll rate signal, a yaw rate sensor for generating a yaw rate signal, a lateral acceleration sensor for generating a lateral acceleration signal, and a longitudinal acceleration sensor for generating a longitudinal acceleration signal. A controller is coupled to the sensors and determines a steady state pitch angle and a steady state roll angle as a function of the lateral acceleration signal, the longitudinal acceleration signal, the yaw rate signal, and the vehicle speed signal. The controller determines a sliding index as a function of the steady state pitch signal, the steady state roll angle, and the roll rate signal. The controller determines lateral velocity as a function of the sliding index.

In a further aspect of the invention, a method of controlling a vehicle comprises measuring a vehicle speed; measuring a roll rate of the vehicle; measuring a yaw rate signal of the vehicle; measuring a lateral acceleration signal of the vehicle; measuring a longitudinal acceleration of the vehicle; and determining a lateral velocity as a function of the longitudinal acceleration, the vehicle speed, the lateral acceleration signal, the yaw rate signal and the roll rate signal; and controlling a safety system in response to the lateral velocity and the other calculated and measured variables.

It is an advantage of the present invention that a closed form formula for lateral velocity and a reliable computation provides an estimation of the vehicle lateral velocity. It is a further advantage of the present invention that the estimation of the lateral velocity is accurate regardless of road profile (flat, banked, or graded road surface), road surface condition (low or high mu), and driving conditions (large or small roll/pitch/yaw combined motion).

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
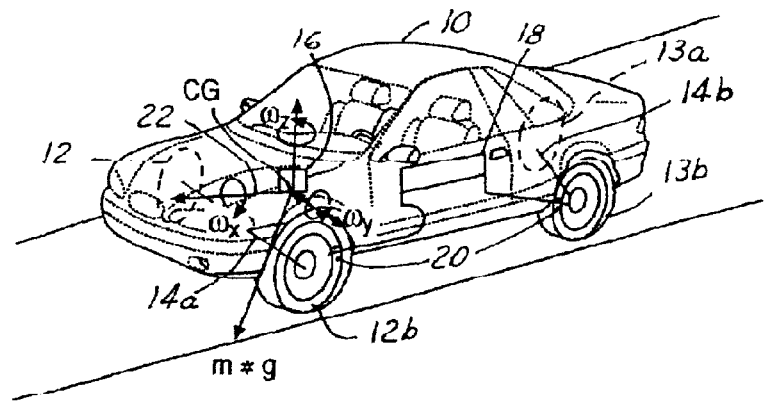
FIG. 1 is a diagrammatic view of a vehicle with variable vectors and coordinator frames according to the present invention.

In the following figures the same reference numerals will be used to identify the same components. The present invention is preferably used in conjunction with a safety system such as a yaw stability control system or a roll stability control system for an automotive vehicle. However, the present invention may also be used with a deployed safety system device such as airbag. The present invention will be discussed below in terms of preferred embodiments relating to an automotive vehicle moving in a three-dimensional road terrain.

Referring to FIG. 1, an automotive vehicle 10 with a safety system of the present invention is illustrated with various forces and moments acting thereon. Vehicle 10 has front right and front left tires 12a, 12b and rear right and rear left tires 13a, 13b respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is coupled to a control system 18. The sensing system 16 preferably uses a standard yaw stability control sensor set (including lateral acceleration sensor, yaw rate sensor, and wheel speed sensor) together with a roll rate sensor and a longitudinal acceleration sensor. The various sensors will be further described below. The wheel speed sensors 20 are mounted at each corner of the vehicle, and the rest of the sensors of sensing system 16 are preferably mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the longitudinal or x axis pointing forward, $b_2$ corresponding to the lateral or y axis pointing off the driving side (to the left), and the $b_3$ corresponding to the vertical or z axis pointing upward. The angular rates of the car body are denoted about their respective axes as $w_x$ for the roll rate, $w_y$ for the pitch rate and $w_z$ for the yaw rate.

The angular rate sensors and the acceleration sensors are mounted on the vehicle car body along the body frame directions $b_1$, $b_2$ and $b_3$, which are the x-y-z axes of the vehicle's sprung mass.

The longitudinal acceleration sensor is mounted on the car body at the center of gravity with its sensing direction along $b_1$-axis, and its output is denoted as $a_x$. The lateral acceleration sensor is mounted on the car body at the center of gravity with its sensing direction along $b_2$-axis, and its output is denoted as $a_y$.

Figure 2:
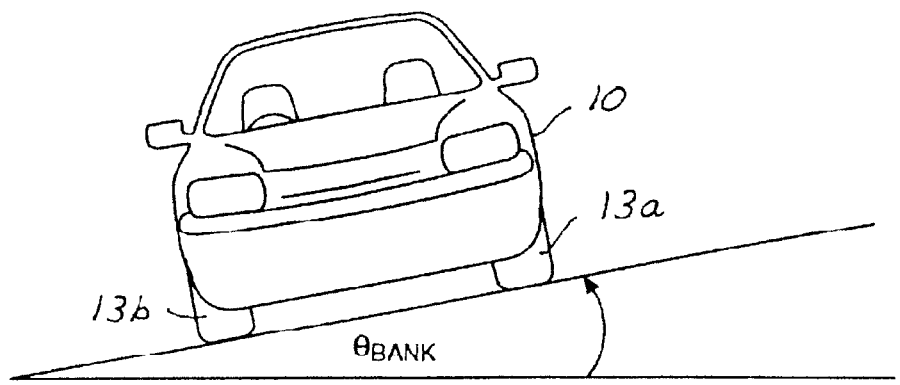
FIG. 2 is an end view of an automotive vehicle on a bank.

Referring now to FIG. 2, the present invention determines a lateral velocity by compensating a road bank angle $\theta_{bank}$ if the vehicle body has small roll attitude with respect to the road surface, or otherwise a vehicle roll attitude angle $\theta_x$ which is the global roll angle of the vehicle body with respect to the sea level. A steady state roll angle may be used in the determination. Thus, the presence of either road bank or large vehicle roll attitude change will still allow an accurate determination of lateral velocity of the vehicle using the present invention.

Figure 3:
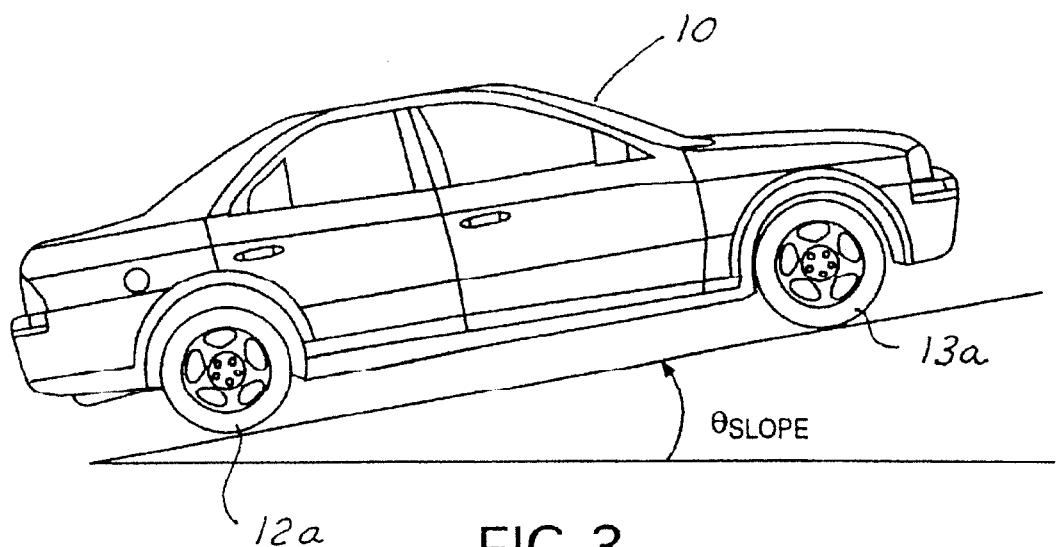
FIG. 3 is a side view of a vehicle on a pitch slope.

Referring now to FIG. 3, the present invention determines lateral velocity by compensating a slope or pitch angle $\theta_{slope}$ if the vehicle body has small pitch attitude with respect to the road surface, or otherwise a vehicle pitch attitude angle $\theta_y$, which is the global pitch angle of the vehicle body with respect to the sea level. A steady state pitch angle may be used in the determination. Thus, the presence of either road pitch or large vehicle pitch attitude will still allow an accurate determination of lateral velocity with the system of the present invention.

Figure 4:
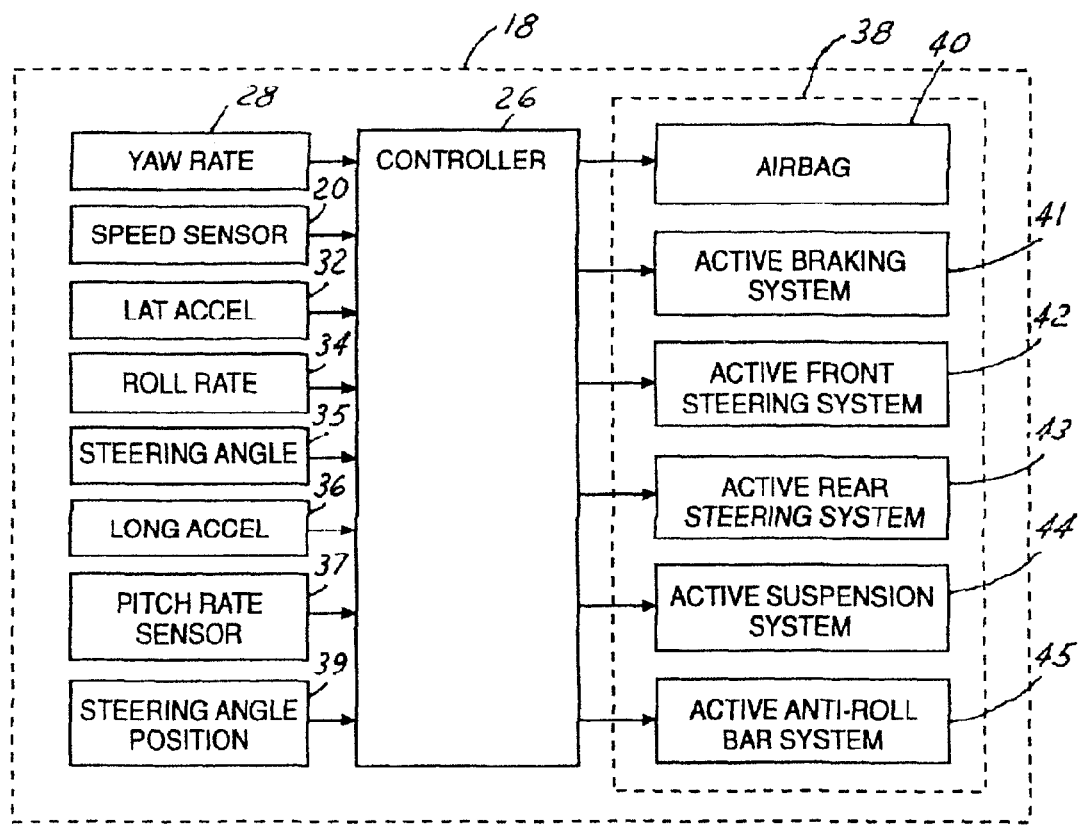
FIG. 4 is a block diagram of a stability system according to the present invention.

Referring now to FIG. 4, control system 18 is illustrated in further detail having a controller 26 used for receiving information from a number of sensors which may include a yaw rate sensor 28, a speed sensor 20, a lateral acceleration sensor 32, a roll rate sensor 34, a steering angle sensor (hand wheel position) 35, a longitudinal acceleration sensor 36, a pitch rate sensor 37 and steering angle position sensor 39.

In the preferred embodiment, only two axial rate sensors are used. When two of these axial rates are known, the other may be derived using other commonly available sensors. Preferably, yaw rate and roll rate are used as the axial rate sensors. Although pitch rate sensor 37 is illustrated, it may be eliminated in the preferred embodiment.

In the preferred embodiment, the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, control circuit 26 may control a safety device 38. Depending on the desired sensitivity of the system and various other factors, not all the sensors 28–39 may be used in a commercial embodiment. Safety device 38 may control an airbag 40, an active braking system 41, an active front steering system 42, an active rear steering system 43, an active suspension system 44, and an active anti-roll bar system 45, or combinations thereof. Each of the systems 40–44 may have their own controllers for activating each one. As mentioned above, the safety system 38 is preferably at least the active braking system 41.

Roll rate sensor 34 and pitch rate sensor 37 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components. Roll and pitch rate sensors 34,37 may comprise a linear height or travel sensor, a rotary height or travel sensor, a wheel speed sensor used to look for a change in velocity, a steering wheel position sensor, a steering wheel velocity sensor and/or a driver heading command input from an electronic component that may include steer by wire using a hand wheel or joy stick.

The roll rate may also be determined by sensing the force or torque associated with the loading condition of one or more suspension or chassis components. These parameters may be measured by a pressure transducer in an active air suspension, a shock absorber sensor such as a load cell, a strain gauge, a steering system absolute or relative motor load sensor, a steering system hydraulic pressure sensor, a lateral force sensor or sensors, a longitudinal tire force sensor, a vertical tire force sensor or a tire sidewall torsion sensor.

The roll rate of the vehicle may also be established by one or more of the following: translational or rotational positions, velocities or accelerations of the vehicle. These parameters may me determined by one or more of the following: a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Based on the inputs from sensors 28 through 39, controller 26 determines a roll condition and controls any one or more of the safety devices 40–45.

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error.

From a basic dynamics consideration, there are kinematic relationships among the following variables for a moving vehicle: the lateral acceleration $a_y$, the longitudinal acceleration $a_x$, the roll rate $\omega_x$, the yaw rate $\omega_z$, the vehicle reference velocity $v_x$, the vehicle body roll attitude $\theta_x$, the vehicle body pitch attitude (slope angle) $\theta_y$, the vehicle lateral velocity $v_y$ and the pitch rate $\omega_y$. These kinematic relationships can be expressed through the following nonlinear and differential equations $$a_x = \dot{v}_x - \omega_z v_y - g\sin(\theta_y)$$
$$a_y = \dot{v}_y + \omega_z v_x + g\sin(\theta_x)\cos(\theta_y)$$
$$\dot{\theta}_x = \omega_x + [\omega_y \sin(\theta_x) + \omega_{z3}\cos(\theta_x)]\tan(\theta_y)$$
$$\dot{\theta}_y = \omega_y \cos(\theta_x) - \omega_z \sin(\theta_x) \quad (1.1)$$

As mentioned before, the determination of lateral velocity used through the first equation of (1.1) might be expressed as $$\dot{v}_y = a_y - [\omega_z v_x + g\sin(\theta_x)\cos(\theta_y)]$$

and the existing methods in current literature neglecting the vehicle global pitch and roll attitudes leads to $$\dot{v}_y \approx a_y - \omega_z v_x$$

Also notice that even though the vehicle global attitudes $\theta_x$ and $\theta_y$ are available, a careful integration scheme needs to be chosen in order to get $v_y$ through integrating $a_y - [\omega_z v_x + g\sin(\theta_x)\cos(\theta_y)]$. Since $v_y$ could have both high frequency and low frequency components, a simple integration with high-pass filter may not obtain the desired result. This difficulty is because it is hard to distinguish between the integration drifting and the actual low frequency sliding of the vehicle. The present invention obtains an accurate estimation regardless of such difficulties.

In the current vehicular yaw or roll stability control, $a_y$, $a_x$, $\omega_x$ and $\omega_y$ are measured sensor signals, and $v_x$ is known (calculated from the wheel speed sensor signals and the other calculated signals used in yaw stability controls), while $\theta_x$, $\theta_y$, $v_y$ and $\omega_y$ are unknown. Hence, computing the vehicle lateral velocity from Equation (1.1) requires solving a set of nonlinear differential equations. The solution to the above nonlinear differential equations can be obtained through solving a single linear but time-varying differential equation. The advantage of solving a linear-time varying differential equation over solving nonlinear differential equations is that the closed-form solution for linear differential equations in general can be found, which is usually impossible for nonlinear differential equations. The closed-form solution directly calculates lateral velocity $v_y$ from the known signals $a_y$, $a_x$, $\omega_x$, $\omega_z$ and $v_x$ by eliminating the known variables $\theta_x$, $\theta_y$ and $\omega_y$. One advantage of this treatment is that potential numerical errors found in integration for $\theta_x$, $\theta_y$ and $\omega_y$ will be eliminated. Therefore, the system is more robust and reliable.

If a vehicle is driving on a stable condition, the lateral velocity is likely to be close to zero. In this case, the corresponding vehicle roll and pitch attitudes are denoted as $\theta_{xss}$ and $\theta_{yss}$, which can be obtained by setting $v_y = 0$ in the first two equations of Equation (1.1).

$$\theta_{yss} = a\sin\left(\frac{\dot{v}_x - a_x}{g}\right) \quad (1.2)$$

$$\theta_{xss} = a\sin\left(\frac{a_y - \omega_z v_x}{g\cos(\theta_{yss})}\right)$$

Notice that Equation (1.2) does not correspond to any real values of the vehicle attitudes if the vehicle has significant sliding motion in the lateral direction, and in this case, the vehicle attitudes obey the following $$\theta_y = a\sin\left[\sin(\theta_{yss}) - \omega_z \frac{v_y}{g}\right] \quad (1.3)$$

$$\theta_x = a\sin\left[\frac{a_y - \omega_z v_x}{g\cos(\theta_y)} - \frac{\dot{v}_y}{g\cos(\theta_y)}\right]$$

Considering the vehicle attitudes are small enough such that the small angle assumption holds, then (1.3) can be simplified to the following $$\theta_y = \theta_{yss} - \omega_2 \frac{v_y}{g} \quad (1.4)$$

$$\theta_x = \theta_{xss} - \frac{\dot{v}_y}{g}$$

Further, using a small angle assumption to the third equation of Equation (1.1), the following relationship is true $$\dot{\theta}_x = \omega_x + \dot{\theta}_y \tan(\theta_y)\tan(\theta_x) + \omega_z \tan(\theta_y)\sec(\theta_x) \quad (1.5)$$

$$\approx \omega_x + \left[\dot{\theta}_{yss} - \dot{\omega}_z \frac{v_y}{g} - \omega_z \frac{\dot{v}_y}{g}\right]\theta_{yss}\theta_{xss} + \omega_z \theta_y$$

$$\approx \omega_x + \omega_z \theta_y$$

Define the following as the slide index $$SI = (\dot{\theta}_{xss} - \omega_x - \omega_z \theta_{yss})g \quad (1.6)$$

then the lateral velocity satisfies the following single differential equation at any time instant t $$\dot{v}_y(t) + \omega_z(t)^2 v_y(t) = SI(t) \quad (1.7)$$

Notice that SI characterize the strength of the sliding of the vehicle by using the known or the calculated and the measured variables. If SI=0, (1.7) leads to $$v_y(t) + \omega_z(t)^2 v_y(t) = 0$$

and the only solution $v_y$ satisfying the above is $v_y=0$. Therefore, a small magnitude of SI implies a small amount of lateral velocity, hence small sliding of the vehicle; a large magnitude of SI implies a large magnitude of lateral velocity, hence large sliding of the vehicle. This is also the reason this quantity is called a sliding index. Based on the above discussion, the determination of the lateral velocity might be conducted as in the following for some threshold s of the sliding index if $|SI(k)| \leq s$
{
  vehicle lateral velocity is negligible.
}
else if $|SI(k)| > s$
{
  vehicle lateral velocity is significant
  quantitatively computing vehicle lateral velocity }

Although Equation (1.7) could be used to solve for lateral velocity in real-time using Tyler expansion plus difference equations and numerical integration, such an approach is not robust and reliable for real time implementation due to potential uncontrollable accumulative error and low frequency drifting of the integration.

If the vehicle yaw rate $\omega_z(t)$ is kept constant, for instance $\omega_z(t) = \Omega$, with time elapse, the lateral velocity could be directly solved in closed form expression as $$v_y(t) = \frac{1}{\Omega}\left[-\cos(\Omega t)\int_0^t SI(\tau)\sin(\Omega \tau)d\tau + \sin(\Omega t)\int_0^t SI(\tau)\cos(\Omega \tau)d\tau\right] \quad (1.8)$$

Since the vehicle yaw rate is usually time-varying, hence the above closed form solution in (1.8) might not be useful. However, if we replace the constant $\Omega$ by the integration of the yaw rate as in the following $$\Omega_t = \int_0^t \omega_z(\tau)d\tau \quad (1.9)$$

then the lateral velocity and its derivative can be expressed as in the following $$v_y(t) = \frac{1}{\omega_z(t)}\left[-\cos(\Omega_t)\int_0^t SI(\tau)\sin(\Omega_\tau)d\tau + \sin(\Omega_t)\int_0^t SI(\tau)\cos(\Omega_\tau)d\tau\right]$$

That is, the lateral acceleration is related to the projection of the sliding index using the yaw angle of the vehicle.

In order to verify that the solution documented in Equation (1.10) does obey the linear time varying differential Equation (1.7), the time derivative for $\dot{v}_y(t)$ is found. Notice that $\dot{\Omega}_t = \omega_z(t)$, hence $$\ddot{v}_y(t) = \frac{d\dot{v}_y(t)}{dt}$$
$$= \cos(\Omega_t)\dot{\Omega}_t \int_0^t SI(\tau)\sin(\Omega_\tau)d\tau -$$
$$\sin(\Omega_t)\dot{\Omega}_t \int_0^t SI(\tau)\cos(\Omega_\tau)d\tau + \sin(\Omega_t)SI(t)\sin(\Omega_t) +$$
$$\cos(\Omega_t)SI(t)\cos(\Omega_t)$$
$$= -\omega_z(t)^2 v_y(t) + SI(t)$$

which implies that the solution expressed in Equation (1.10) does satisfy Equation (1.7).

Since the lateral velocity $v_y(t)$ and its derivative $\dot{v}_y(t)$ described in Equation (1.10) come from a kinematic equation, they are accurate regardless of the vehicle's driving condition, the road condition, the road surface condition and the vehicle platform as soon as the sensors are mounted on the center of gravity of the car body and the relative attitudes of the vehicle with respect to the average road surface are accurately calculated. Another advantage of the above computation of the lateral velocity is that it does not explicitly involve the road bank, road slope and vehicle attitude information, and the influence of all those variables is reflected by the relationship shown in the differential Equation (1.7) through the sliding index.

A numerical implementation of the closed-form solution in Equation (1.10) is performed to allow the implementation in a useful manner. The yaw angle of the vehicle car body $\Omega_t$, as defined in Equation (1.9), can be computed using the following pure integration scheme $$\Omega_{k+1} = \Omega_k + \omega_{z_{k+1}}\Delta T \quad (1.11)$$

where $\Delta T$ is the sampling time of the control system, $\Omega_{k+1}$ and $\omega_{z_{k+1}}$ are the values of the yaw angle and the yaw rate sensor at time instant $t=(k+1)\Delta T$. Because of the potential drift problem, Equation (1.11) may not be close to the actual yaw angle. However, $\Omega_{k+1}$ appears only in sine and cosine functions, drifting may be eliminated by using the following congruent mod operation $$\Omega_{g_{k+1}} = \Omega_{k+1} - 2\pi\, floor\left(\frac{\Omega_{k+1}}{2\pi}\right) \quad (1.12)$$

Combining (1.11) and (1.12), the following iterative scheme can be used to compute the congruent-mod yaw angle $$\Omega_k = \Omega_k - 2\pi\, floor\left(\frac{\Omega_k}{2\pi}\right)$$

Notice that $\Omega_{g_{k+1}}$ calculated in (1.12) falls always within 0 and $2\pi$. The floor(•) is a function which is the largest integer bounded by the real number •. That is, $$floor\left(\frac{\Omega(k+1)}{2\pi}\right)$$

always removes out of the portion that are integer times of $2\pi$ from $\Omega(k+1)$, and it outputs a quantity with value falling in between 0 and $2\pi$. This function is common in "C" programming language. The following intermediate variables may be computed.

The projections of the sliding index SI along the yaw angle directions can now be computed based on the computed $\Omega_{g_{k+1}}$. Define $SI\sin\,int = \int_0^t SI(\tau)\sin(\Omega_\tau)d\tau$ $SI\cos\,int = \int_0^t SI(\tau)\cos(\Omega_\tau)d\tau$ then the numerical computation of them using the following anti-drift-integration filter $$T_{AID}(z^{-1}) = \frac{d(1-z^{-2})}{1 - c_1 z^{-1} + c_2 z^{-2}}$$

can be obtained as the following $SI\sin\,int_{k+1} = c_1 SI\sin\,int_k - c_2 SI\sin\,int_{k-1} + d[SI_{k+1}\sin(\Omega_{g_{k+1}}) - SI_{k-1}\sin(\Omega_{g_{k-1}})]$ $$SI\sin int_{k+1} = c_1 SI\sin int_k - c_2 SI\sin int_{k-1} + d[SI_{k+1}\cos(\Omega_{g_{k+1}}) - SI_{k-1}\cos(\Omega_{g_{k-1}})] \quad (1.13)$$

Using the numerical scheme shown in Equation (1.13), the following computation for the lateral velocity and its derivative based upon the sliding index along the yaw angle direction is shown as $$v_{y_{k+1}} = \frac{1}{\omega_{z_{k+1}}}[-\cos(\Omega_{g_{k+1}})SI\sin int_{k+1} + \sin(\Omega_{g_{k+1}})SI\cos int_{k+1}] \quad (1.14)$$

$$\dot{v}_{y_{k+1}} = \sin(\Omega_{g_{k+1}})SI\sin int_{k+1} + \cos(\Omega_{g_{k+1}})SI\cos int_{k+1}$$

As mentioned above, a control signal may then be developed based on the lateral velocity and perhaps the lateral velocity derivative found in Equation (1.14). For example, a roll or a yaw stability control system may derive the control signal therefrom. Of course, multiple systems may simultaneously use the lateral velocity and/or the lateral velocity derivative in its computations.

Figure 5:
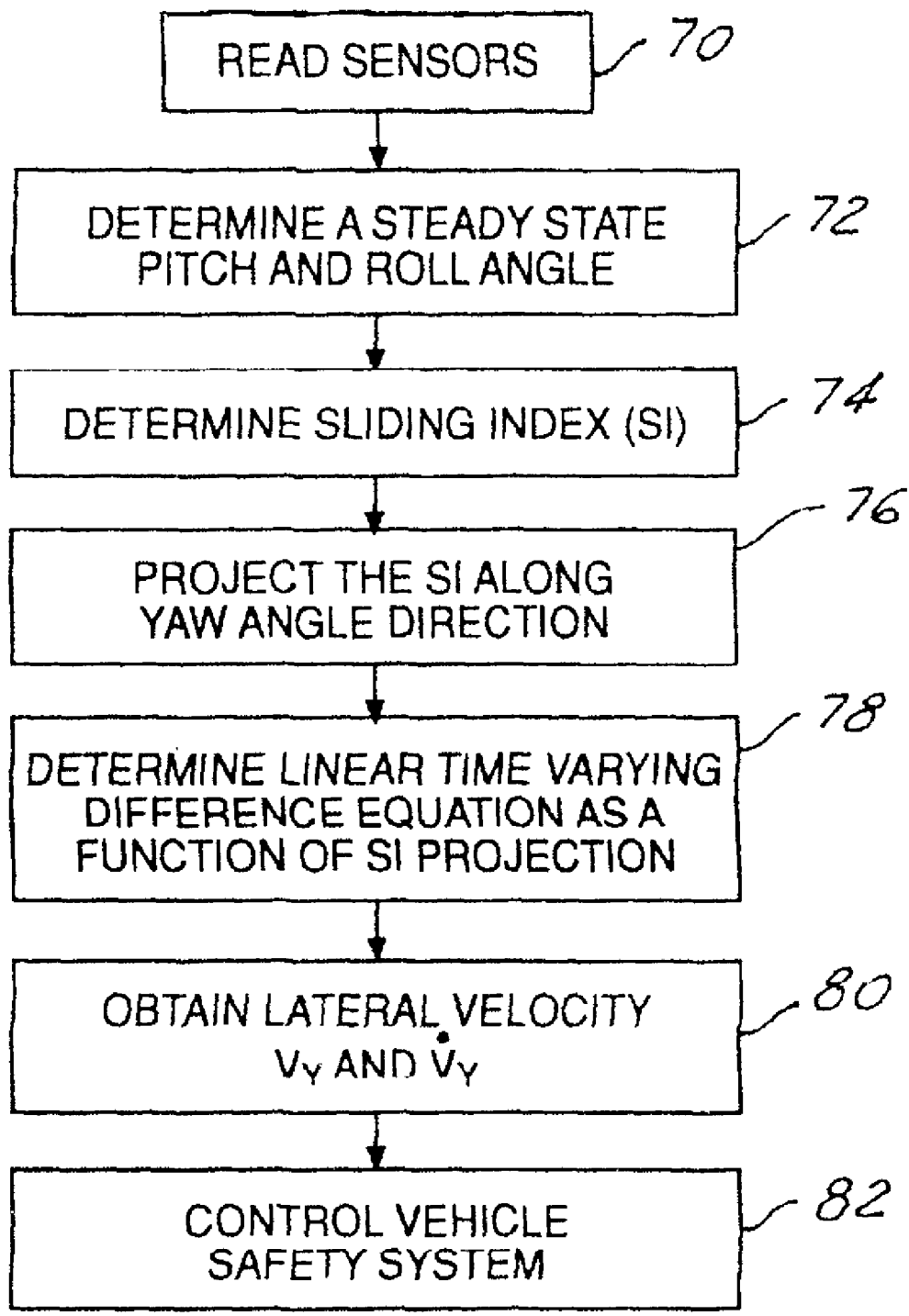
FIG. 5 is a flow chart of the operation according to the present invention.

Referring now to FIG. 5, a summary flow chart illustrating the process is illustrated. The various sensors are read in step 70. In the following examples the yaw rate sensor 28, the roll rate sensor 34, the speed sensor 20, lateral acceleration sensor 32, and longitudinal acceleration sensor 36 are used. A steady state pitch and roll angle in step 72 is obtained from Equation (1.2) above. A sliding index is determined in step 74 which corresponds to Equation (1.6) above. The sliding index is projected along the yaw angle direction in step 76. The yaw angle projection is set forth in Equation (1.13).

Based upon the projection of the sliding index along the yaw angle direction, step 78 determines a linear time varying differential equation as a function of the sliding index projection. In step 80, the lateral velocity and the velocity derivative are obtained. In step 82, a control system such as a safety system is controlled in response to the lateral velocity and/or the lateral velocity derivative.

While particular embodiments of the invention have been shown and described, numerous variations and alternate embodiments will occur to those skilled in the art. Accordingly, it is intended that the invention be limited only in terms of the appended claims.

What is claimed is:

1. An apparatus for determining lateral velocity of an automotive vehicle comprising:
   a vehicle speed sensor for generating a vehicle speed signal;
   a roll rate sensor for generating a roll rate signal;
   a yaw rate sensor for generating a yaw rate signal;
   a lateral acceleration sensor for generating a lateral acceleration signal;
   a longitudinal acceleration sensor for generating a longitudinal acceleration signal; and
   a controller coupled to the sensors for determining a steady state pitch angle and a steady state roll angle as a function of the lateral acceleration signal, the longitudinal acceleration signal, the yaw rate signal, and the vehicle speed signal, determining a sliding index as a function of the steady state pitch angle, the steady state roll angle and the roll rate signal, and determining a lateral velocity as a function of the sliding index.

2. An apparatus as recited in claim 1 further comprising a safety system coupled to said controller, said safety system operating in response to said lateral velocity.

3. An apparatus as recited in claim 2 wherein the safety system comprises a yaw control system.

4. An apparatus as recited in claim 2 wherein the safety system comprises a roll stability control system.

5. An apparatus as recited in claim 1 wherein said controller determines a lateral velocity and a lateral velocity derivative as a function of the sliding index.

6. A method of controlling a vehicle comprising:
   measuring a vehicle speed;
   measuring a roll rate of the vehicle;
   measuring a yaw rate of the vehicle;
   measuring a lateral acceleration of the vehicle;
   measuring a longitudinal acceleration of the vehicle; and
   determining a lateral velocity as a function of the longitudinal acceleration, the vehicle speed, the lateral acceleration, the yaw rate and the roll rate; and
   controlling a safety system in response to the lateral velocity.

7. A method as recited in claim 6, wherein determining a lateral velocity further comprises determining a steady state pitch angle as a function of the longitudinal acceleration and the vehicle speed.

8. A method as recited in claim 7, wherein determining a lateral velocity further comprises determining a steady state roll angle as a function of the lateral acceleration, the yaw rate, and the vehicle speed.

9. A method as recited in claim 8, wherein determining a lateral velocity further comprises determining a sliding index as a function of the steady state pitch angle, the steady state roll angle and the roll rate.

10. A method of controlling a vehicle comprising:
    measuring a vehicle speed;
    measuring a roll rate of the vehicle;
    measuring a yaw rate of the vehicle;
    measuring a lateral acceleration of the vehicle;
    measuring a longitudinal acceleration of the vehicle;
    determining a steady state pitch angle as a function of the longitudinal acceleration and the vehicle speed;
    determining a steady state roll angle as function of the lateral acceleration, the yaw rate, and the vehicle speed;
    determining a sliding index as a function of the steady state pitch angle, the steady state roll angle and the roll rate; and
    determining a lateral velocity as a function of the sliding index; and
    controlling a safety system in response to the lateral velocity.

11. A method as recited in claim 10 further comprising determining a lateral velocity derivative as a function of the sliding index.

12. A method as recited in claim 10 wherein the safety system comprises a yaw control system.

13. A method as recited in claim 10 wherein the safety system comprises a rollover control system.

14. A method as recited in claim 10 further comprising generating a differential equation obeyed by the lateral velocity and its derivative by using the said sliding index.

15. A method as recited in claim 14 wherein said differential equation is derived by projecting the sliding index along a yaw angle direction.

16. A method as recited in claim 15 wherein the step of projecting the sliding index along the yaw angle directions is accomplished using an anti-drift-integration filter.

17. A method as recited in claim 16 wherein the anti-drift-integration filter is determined in response to the yaw angle, further comprising computing yaw angle through pure integration and $2\pi$ congruent mod operation, such that the accumulated integration error of the yaw angle is eliminated.

* * * * *